(12) United States Patent
Landrum et al.

(10) Patent No.: US 8,839,948 B2
(45) Date of Patent: Sep. 23, 2014

(54) CLOSED-LOOP MAGNETIC POSITIONING OF CONVEYOR BELTS

(75) Inventors: John F. Landrum, New Orleans, LA (US); Glenn R. McCall, Harvey, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/994,414

(22) PCT Filed: Dec. 7, 2011

(86) PCT No.: PCT/US2011/063773
§ 371 (c)(1),
(2), (4) Date: Jun. 14, 2013

(87) PCT Pub. No.: WO2012/087577
PCT Pub. Date: Jun. 28, 2012

(65) Prior Publication Data
US 2013/0264175 A1    Oct. 10, 2013

Related U.S. Application Data

(60) Provisional application No. 61/425,620, filed on Dec. 21, 2010.

(51) Int. Cl.
| | |
|---|---|
| B65G 15/02 | (2006.01) |
| B65G 15/60 | (2006.01) |
| B65G 21/20 | (2006.01) |
| B65G 15/64 | (2006.01) |

(52) U.S. Cl.
CPC ............ B65G 15/60 (2013.01); B65G 21/2009 (2013.01); B65G 15/64 (2013.01)
USPC .............................. 198/805; 198/852; 198/617

(58) Field of Classification Search
CPC ........ B65G 15/64; B65G 15/60; B65G 15/02; B65G 21/2009
USPC .......................... 198/805, 831, 852, 619, 617
See application file for complete search history.

(56) References Cited

U.S. PATENT DOCUMENTS

| | | | |
|---|---|---|---|
| 2,731,212 A | 1/1956 | Baker | |
| 4,491,777 A | 1/1985 | Beck et al. | |
| 4,805,761 A | 2/1989 | Totsch | |
| 4,981,208 A * | 1/1991 | Jones | ............................ 198/778 |
| 5,165,527 A * | 11/1992 | Garbagnati | ................... 198/805 |

(Continued)

FOREIGN PATENT DOCUMENTS

| | | |
|---|---|---|
| DE | 10247909 A1 | 4/2004 |
| JP | 60112512 A | 6/1985 |
| JP | 62016908 A | 1/1987 |
| JP | 63262006 A | 10/1988 |

*Primary Examiner* — Mark A Deuble
(74) *Attorney, Agent, or Firm* — James T. Cronvich

(57) ABSTRACT

A conveyor having a conveyor belt with magnetic properties that allow the belt's position to be controlled by externally generated magnetic fields and methods for controlling such a conveyor belt. Sensors sense an operating condition of the belt, such as belt speed, belt tension, belt loading, belt lateral, or radial, position, or belt elevation, and send those measurements to a controller. Electromagnets in the conveyor frame generate magnetic fields that interact with the magnetic properties of the belt to apply selected forces to position the belt in the conveyor. The controller adjusts the strength and direction of the magnetic fields generated by the electromagnets to control the operating conditions of the belt.

20 Claims, 4 Drawing Sheets

(56) References Cited

U.S. PATENT DOCUMENTS

| | | | |
|---|---|---|---|
| 5,738,205 A | * | 4/1998 | Dr.ae butted.bel ............ 198/852 |
| 6,085,896 A | * | 7/2000 | van Zijderveld ............. 198/841 |
| 6,971,507 B2 | | 12/2005 | Forman |
| 7,212,400 B2 | * | 5/2007 | Fan et al. ................. 361/679.58 |
| 7,597,188 B2 | | 10/2009 | Volpi |
| 2010/0012469 A1 | | 1/2010 | Szarkowski et al. |

* cited by examiner

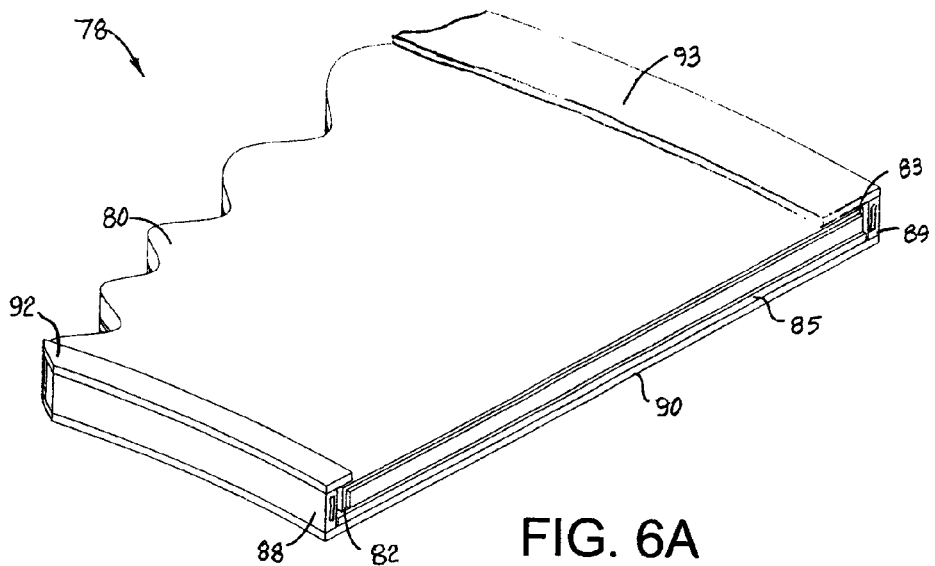
FIG. 6A
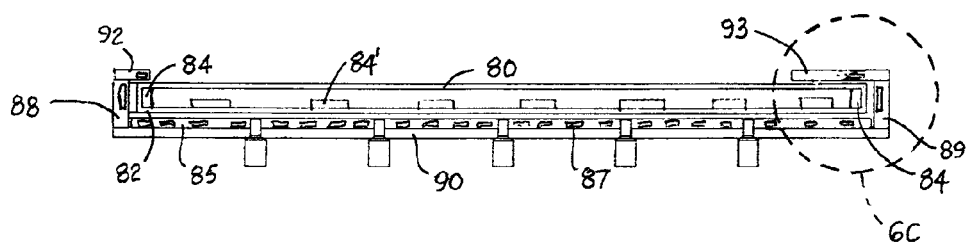
FIG. 6B
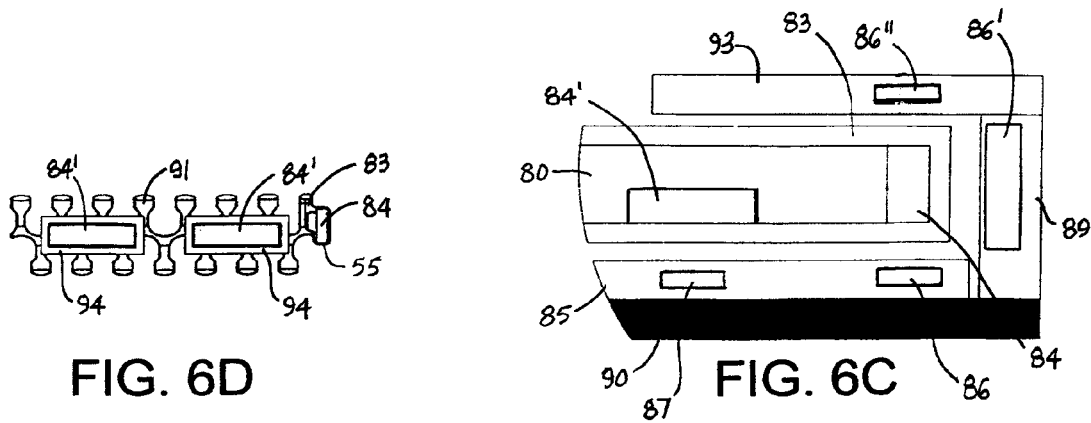
FIG. 6D
FIG. 6C

CLOSED-LOOP MAGNETIC POSITIONING OF CONVEYOR BELTS

BACKGROUND

The invention relates generally to power-driven conveyors and more particularly to belt conveyors and associated methods in which conveyor belts having magnetic properties are repelled or are attracted by controllable electromagnets to control belt position to reduce friction or otherwise improve conveyor performance.

Permanent magnets have been used in belt and chain conveyors to reduce friction between belts and conveyor frames and to levitate belts by the force of magnetic repulsion and to prevent belts from rising out of their tracks by the force of magnetic attraction. Permanent magnets in a conveyor frame form magnetic fields that interact with permanent magnets or metallic materials in a conveyor belt to apply forces on the belt that can, for example, be directed to reduce the frictional contact between the belt and the conveyor frame. The strength and arrangement of the magnets is selected for the specific application. Often, however, conveyor operating conditions, such as belt load and belt speed, can change. The change in operating conditions may change the belt dynamics enough that the strength and arrangement of the permanent magnets are suboptimal for the changed operating condition.

SUMMARY

A conveyor embodying features of the invention comprises a conveyor belt supported in a conveyor frame. The conveyor belt has magnetic properties that allow the belt to be attracted or repelled by a magnetic field. Electromagnets disposed along a conveyor frame are arranged to generate magnetic fields that attract or repel the conveyor belt. A sensor sensing an operating condition of the conveyor belt provides a sensor signal that represents the operating condition. A controller receives the sensor signal and controls the magnetic fields generated by the electromagnets in response to the signal to position the conveyor belt in the conveyor frame.

In another aspect of the invention, a method for controlling a conveyor belt comprises: (a) advancing a conveyor belt having magnetic properties along a conveying path; (b) sensing an operating condition of the conveyor belt; (c) subjecting the conveyor belt to magnetic fields along the conveying path; and (d) adjusting the strength of the magnetic fields as a function of the sensed operating condition to position the conveyor belt laterally or vertically along the conveying path.

BRIEF DESCRIPTION OF THE DRAWINGS

These features and aspects of the invention, as well as its advantages, are further described in the following description, appended claims, and accompanying drawings, in which:

FIGS. 6A-6C are isometric, cross sectional, and enlarged views of a levitating conveyor embodying features of the invention, including repelling electromagnets above and below the belt carryway, and FIG. 6D is a bottom plan view of an edge module of the belt.

DETAILED DESCRIPTION

Figure 1:
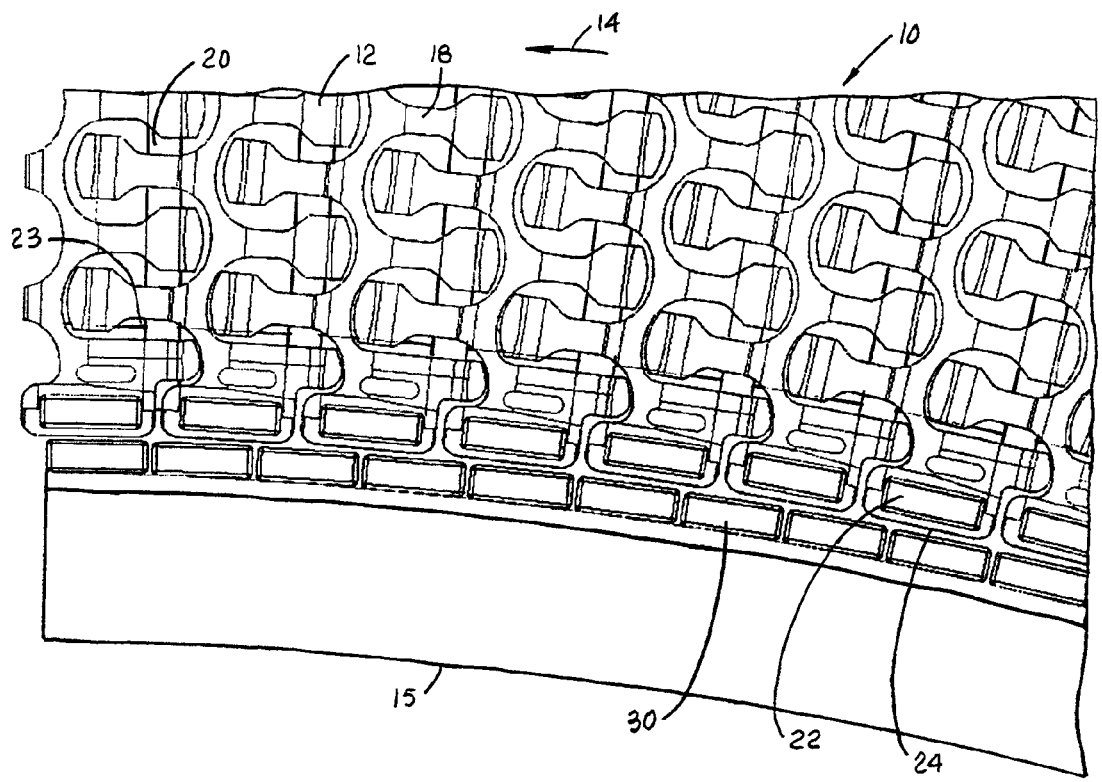
FIG. 1 is a top plan view of a portion of a turn segment of a conveyor embodying features of the invention including a radius conveyor belt with magnets in the inner belt edge and an inner rail with electromagnets.
Figure 2:
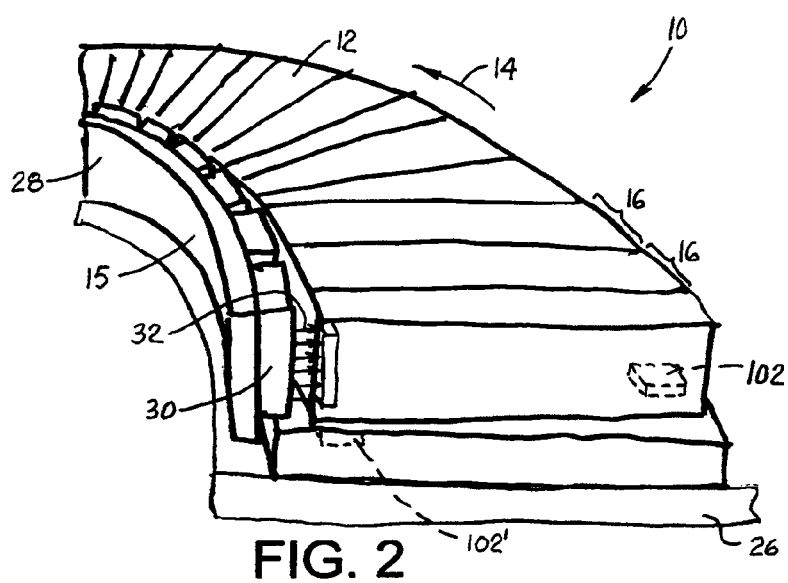
FIG. 2 is an oblique perspective view of the conveyor of FIG. 1.

A portion of one version of a conveyor embodying features of the invention is shown in FIGS. 1 and 2. The conveyor 10 includes a conveyor belt 12 advancing in a direction of belt travel 14 in a turn 15. The exemplary belt 12 shown in FIG. 1 is a modular plastic conveyor belt capable of side flexing to negotiate turns. One example of such a belt structure is the INTRALOX® Series 2200 Radius Flush Grid belt manufactured and sold by Intralox, L.L.C. of Harahan, La., U.S.A. The endless belt comprises a series of rows 16 of belt modules 18 linked together at hinge joints by hinge rods 20. A permanent magnet 22 is embedded or mounted in the side edge 24 of each belt row 20 at the inside of the turn 15. In some instances, the magnets need not reside in each row and can be embedded in every second row, third row, or as needed. The belt rides along a carryway portion of its conveying path atop wearstrips or a carryway pan 23 supported in a conveyor frame 26. The conveyor frame includes an inside rail 28 along the inside of the turn. Electromagnets 30 are mounted on the inside rail 28. The electromagnets, when energized, create a magnetic field 32 that repels the magnets 22 in the inside edge 24 of the belt 12 to position the conveyor belt radially, or laterally, away from the inside rail 28. (In the case of a radius belt in a turn, "laterally" is synonymous with "radially.") In this way, friction between the side edges 24 of the belt and the inside rail 28 including the electromagnets is eliminated in the turn.

Figure 3:
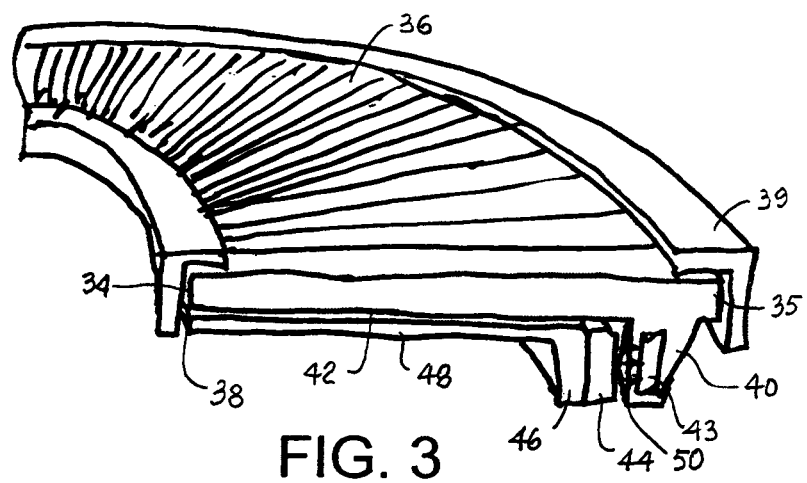
FIG. 3 is an oblique perspective view of a conveyor having an electromagnet repelling a magnet in the outer edge of a belt at the outside of a turn.

FIG. 3 shows another version of a conveyor in which the side edge 34 of a radius conveyor belt 36 is prevented from contacting an inside rail 38 at the inside of the turn by magnetic repulsive forces in the outside of the turn. The conveyor belt 36 has a depending element 40 extending below the bottom surface 42 of the rest of the belt. Embedded in the depending element are one or more magnets 43. An electromagnet 44 is mounted in the outer side 46 of a conveyor pan 48. The electromagnet generates a magnetic field 50 that interacts with the belt magnet 43 to repel the depending element outward and position the belt laterally, or radially, with its inside edge 34 away from the inside rail 38. The inside and outside rails 38, 39 have horizontal lips overlapping the inside and outside edges 34, 35 of the belt to prevent the belt edges from rising out of the carryway.

Figure 4E:
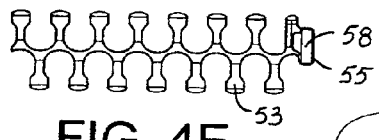
FIG. 4E is a bottom plan view of an edge module of the belt.
Figure 4A:
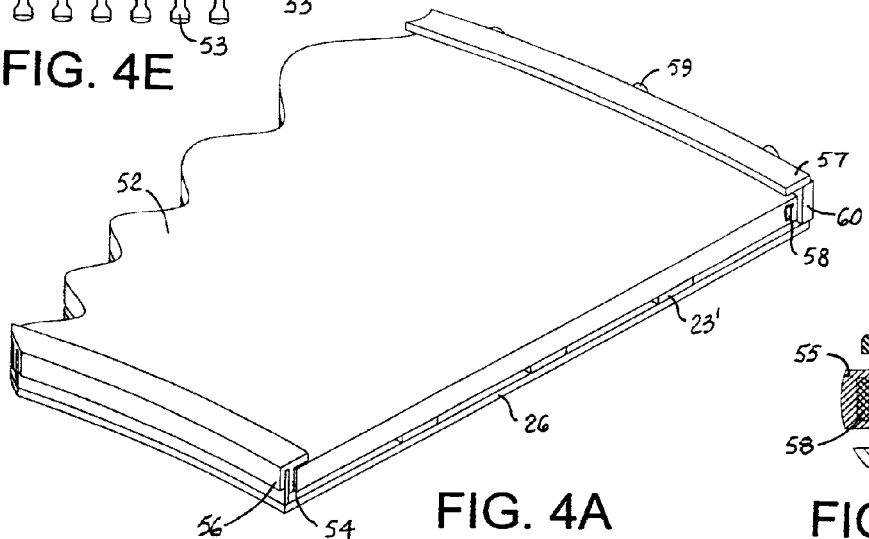
FIGS. 4A-4D are isometric, top plan, cross sectional, and enlarged views of a conveyor having an electromagnet attracting magnetic materials in a belt at the outside of a turn.
Figure 4D:
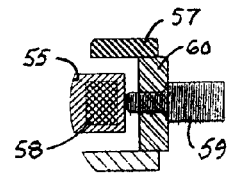
Figure 4B:
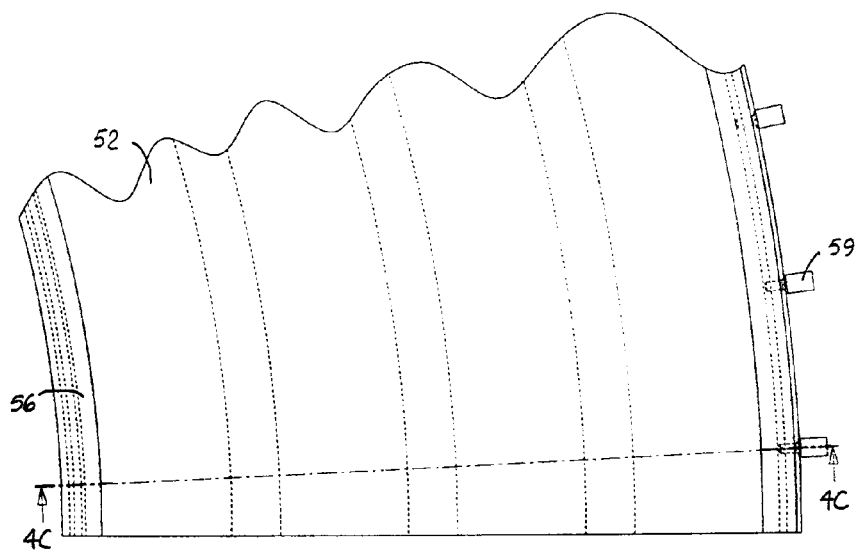
Figure 4C:
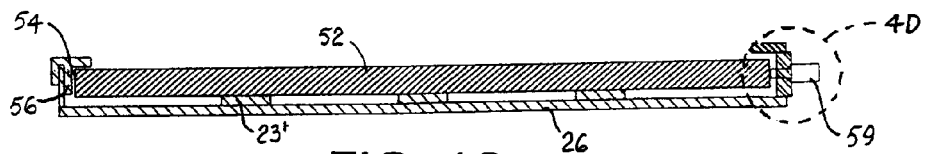

FIGS. 4A-4D show a conveyor belt 52 that uses magnetic attractive forces to pull an inside edge 54 of the belt laterally, or radially, spaced away from an inside rail 56. The belt is supported in the conveyor frame 26 on wearstrips 23'. The belt includes magnets 58 in an outer side edge 55 or includes magnetized or unmagnetized pieces of material that are attracted by electromagnets 60 in an outside rail 57. Thus, the magnetic properties for attraction may be provided by magnetized or unmagnetized ferromagnetic materials. The magnetic force of attraction pulls the belt laterally, or radially, outward in the turn in a position out of frictional contact with the inside rail. Displacement sensors 59 mounted at spaced apart locations along the length of the outside rail 57 are used to detect the proximity of the outside edge 55 to the outside rail. FIG. 4E shows one version of an outside-edge belt module 53 usable in a modular-plastic-conveyor-belt realization of the belt 52. The permanent magnets 52 are embedded in the outer side edge 55 of the module. Proximity sensors, which can be set to detect only one specific distance, may alternatively be used instead of displacement sensors, which can measure actual distances.

Figure 5:
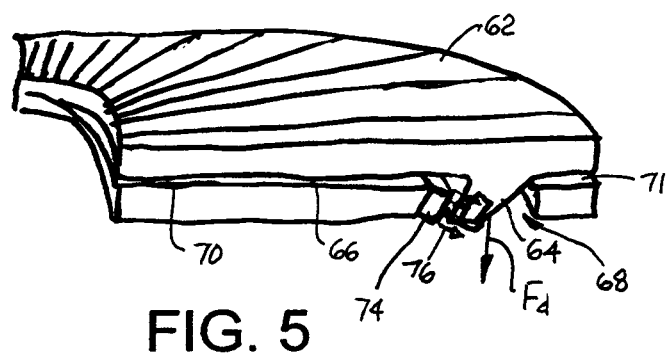
FIG. 5 is an oblique perspective view of a conveyor having an electromagnet repelling a hold down on a belt to hold the belt down at the bottom side of a radius conveyor belt in the outside of a turn.

FIG. 5 shows a radius conveyor belt 62 with a magnetic hold down system. The belt has a depending element 64 extending downward from the bottom side 66 of the belt in a gap 68 between a pair of carryway support surfaces 70, 71. A magnet 72 embedded in the depending element in the gap is oriented on an angle relative to the bottom surface of the belt. An electromagnet 74 mounted in the outer side of the first support surface at the gap generates a magnetic field 76 that repels the belt magnet 72 with a downward component of force $F_d$ that counteracts the tendency of the radius belt to rise at the outside of the turn. Thus, the magnetic interaction determines the belt's vertical and lateral, or radial, position.

A levitating conveyor 78 is shown in FIGS. 6A-6C. The conveyor includes a radius belt 80, whose side edges 82, 83 include magnets 84. Electromagnets 86, 86', 86" disposed in or near side rails 88, 89 are controlled to generate magnetic fields that levitate the belt vertically above an underlying support frame 90, center the belt laterally away from both the inner and outer side rails 88, 89, and prevent the belt from rising into contact with the top lips 92, 93 of the side rails. The relative field strengths of the electromagnets are modulated to position the belt laterally, or radially, and vertically. Not all three sets of electromagnets 86, 86', 86" at each side rail 88, 89 have to be used. For example, a levitating conveyor can be realized by using the lower electromagnets 86 to repel the belt upward above the support frame 90 or by using the upper electromagnets 86" to attract the belt upward. The side electromagnets 86' may be used as needed to maintain the lateral, or radial, position of the belt centered between the vertical surfaces of the opposite side rails with little or no frictional contact. For greater or more uniform levitation across the lateral width of the conveyor, additional electromagnets 87 may be arranged in electromagnet support structure 85 to interact with additional permanent magnets 84' in the belt 80. Displacement or proximity sensors 59, mounted in the electromagnet support structure 85 underlying the belt, detect the elevation of the belt in the conveyor carryway. Thus, the levitated belt, which may alternatively be a straight-running belt, can be operated with low friction. FIG. 6D shows one version of an outside-edge belt module 91 usable in a modular-plastic-conveyor-belt realization of the belt 80. The permanent magnets 84, 84' are embedded in the outer side edge 55 and in bottom-side structure 94 of the module.

Figure 7:
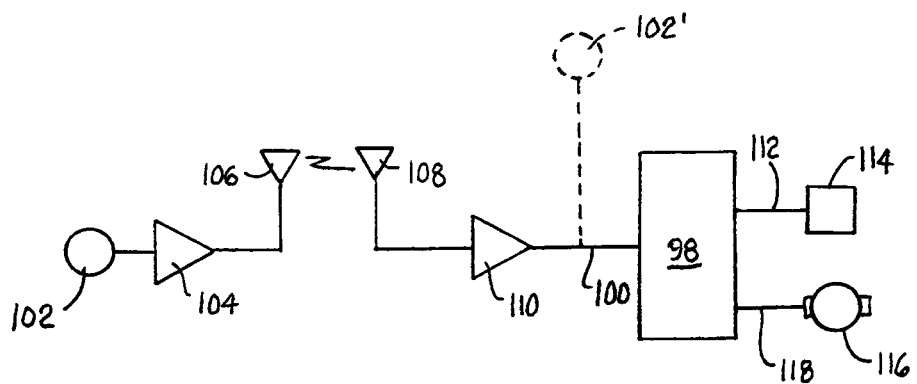
FIG. 7 is a block diagram of a control system usable with the conveyors of FIGS. 1-6.

A simplified version of a closed-loop control system for adjusting the electromagnets for optimal or desired operation of the belt is illustrated by the block diagram of FIG. 7. A controller 98, such as a programmable logic controller, work station, or other programmable computing device, receives an input signal 100 from a sensor 102 embedded in the belt (see FIG. 2) or from a sensor 102', such as the displacement sensors of FIG. 4 or 6 or a current sensor measuring motor current in a belt drive motor 116, in the conveyor frame or on one of the belt's drive components (motor, motor controller, gearbox, or shaft). The sensor or sensors sense one or more operating conditions of the belt, such as belt speed, belt tension, belt loading, or belt elevation. A sensor for belt speed can be realized, for example, as a tachometer mounted to the drive or idle shaft or as a belt cycle counter mounted to the conveyor frame counting belt magnets as they pass by. A sensor for belt tension can be realized as a tension sensor mounted in the belt or as an optical sensor in the side rails sensing belt elongation. A sensor for belt loading can be realized as a weight sensor mounted in the conveyor frame, as a piezoelectric sensor mounted in the belt, or as a motor current sensor. Belt elevation can be sensed by optical or proximity sensors mounted in the side rails. Belt lateral, or radial, position can be sensed by proximity, displacement, or optical sensors in the side rails or on the belt. The measurements made by belt-borne sensors 102 are buffered and transmitted by a transmitter 104 in the belt over an antenna 106. The transmitted sensor signal is received via a remote antenna 108 and receiver 110. The receiver sends the sensor signal to the controller 98. Sensors 102 mounted in the conveyor frame may send their signals to the controller 98 over a hardwired connection, as shown by the dashed lines in FIG. 7, or wirelessly as in the case of belt-borne sensors 102. Control algorithms running in the controller use the sensor signals, factory or operator settings, dynamic models of the conveyor belt, and the magnetic properties of the belts and electromagnets to adjust the field strength, or amplitude, and, in some cases, the polarities of the magnetic fields to position the belt to maintain desired or proper operating conditions. The controller 98 outputs electromagnet control signals 112 to the electromagnets 114 to adjust their fields appropriately. For example, an increase in motor current can indicate a rise in belt tension caused by increased frictional contact between the belt and the inside conveyor rail. The controller could respond to the increased motor current by increasing the repulsive force of the electromagnets to push the inside edge of the belt away from the rail and reduce contact and belt tension. The controller can optionally be programmed to control the speed of the belt's drive motor 116 with a motor-control signal 118. Drivers (not shown) connected between the controller and the electromagnets and motor boost the power to a level sufficient to drive the electromagnets and the motor.

The various arrangements of magnets and electromagnets described represent just some of the possible arrangements for controlling the horizontal or vertical position of a conveyor belt along a carryway. And although the belts were shown with discrete permanent magnets or unmagnetized ferromagnetic elements, the magnetic properties of those elements of the belts can be realized as well by mixing ferromagnetic materials with polymer materials and injection molding those together to form a homogeneous thermoplastic belt module with magnetic properties or by overmolding an outer thermoplastic belt shell around a ferromagnetic core or ferromagnetic elements. Furthermore, the belts may be modular plastic conveyor belts as described, flat rubber or plastic conveyor belts, metal belts or chains, or non-metal belts or chains linked by metal hinge rods, as long as a controllable force can be made to act on them by interaction with magnetic fields generated by electromagnets.

What is claimed is:
1. A conveyor comprising:
a conveyor frame;
a conveyor belt supported in the conveyor frame and having magnetic elements with magnetic properties;
a plurality of electromagnets disposed along the conveyor frame and arranged to generate magnetic fields attracting or repelling the magnetic elements in the conveyor belt;

a sensor sensing an operating condition of the conveyor belt and providing a sensor signal representing the operating condition; and a controller receiving the sensor signal from the sensor and controlling the magnetic fields generated by the electromagnets in response to the sensor signal to interact with the magnetic elements to repel or attract the magnetic elements and position the conveyor belt in the conveyor frame.

2. A conveyor as in claim 1 wherein the magnetic elements comprise a plurality of magnets producing the magnetic properties of the conveyor belt and arranged to interact with the magnetic fields generated by the electromagnets.

3. A conveyor as in claim 2 wherein the magnets are disposed along a first side edge of the conveyor belt and wherein the electromagnets are disposed along the conveyor frame proximate the first side edge of the conveyor belt.

4. A conveyor as in claim 2 wherein the conveyor belt includes depending elements extending below the conveyor belt and housing the magnets and wherein the electromagnets are disposed along the conveyor frame proximate the depending elements.

5. A conveyor as in claim 1 wherein the conveyor belt is magnetized.

6. A conveyor as in claim 1 wherein the conveyor belt is unmagnetized.

7. A conveyor as in claim 1 wherein the sensor rides with the conveyor belt.

8. A conveyor as in claim 1 wherein the sensor is mounted in the conveyor frame.

9. A conveyor as in claim 1 wherein the sensor senses belt speed, belt tension, belt loading, belt lateral position, or belt elevation in the conveyor frame.

10. A conveyor as in claim 1 comprising a motor driving the belt and wherein the sensor is a current sensor sensing motor current.

11. A conveyor as in claim 1 wherein the electromagnets are positioned along the conveyor frame to repel the conveyor belt from below.

12. A conveyor as in claim 1 wherein the electromagnets are positioned along one side of the conveyor frame to repel the conveyor belt away from the side of the conveyor frame.

13. A conveyor as in claim 1 wherein the controller controls the strength of the magnetic fields generated by the electromagnets as a function of the sensed operating condition.

14. A method for controlling a conveyor belt, comprising:
advancing a conveyor belt having magnetic elements with magnetic properties along a conveying path;
sensing an operating condition of the conveyor belt;
subjecting the magnetic elements in the conveyor belt to magnetic fields along the conveying path;
adjusting the strength of the magnetic fields as a function of the sensed operating condition to interact with the magnetic elements to repel or attract the magnetic elements and position the conveyor belt laterally or vertically along the conveying path.

15. The method of claim 14 wherein subjecting the conveyor belt to magnetic fields along the conveyor comprises repelling the conveyor belt.

16. The method of claim 14 wherein subjecting the conveyor belt to magnetic fields along the conveyor comprises attracting the conveyor belt.

17. The method of claim 14 wherein adjusting the strength of the magnetic fields comprises adjusting the current in electromagnets disposed along the conveying path.

18. The method of claim 14 wherein the operating condition is belt speed, belt tension, belt loading, belt lateral position, belt elevation, or belt motor current.

19. A conveyor comprising:
a conveyor frame;
a conveyor belt supported in the conveyor frame and having magnetic properties;
a plurality of electromagnets disposed along the conveyor frame and arranged to generate magnetic fields attracting or repelling the conveyor belt;
a sensor sensing an operating condition of the conveyor belt and providing a sensor signal representing the operating condition; and
a controller receiving the sensor signal from the sensor and controlling the magnetic fields generated by the electromagnets in response to the sensor signal to position the conveyor belt in the conveyor frame;
wherein the conveyor frame includes a turn and wherein the conveyor belt includes magnets in a side edge at the inside of the turn and wherein the electromagnets are disposed along the conveyor frame at the inside of the turn to repel the magnets in the side edge of the conveyor belt.

20. A conveyor comprising:
a conveyor frame;
a conveyor belt supported in the conveyor frame and having magnetic properties;
a plurality of electromagnets disposed along the conveyor frame and arranged to generate magnetic fields attracting or repelling the conveyor belt;
a sensor sensing an operating condition of the conveyor belt and providing a sensor signal representing the operating condition; and
a controller receiving the sensor signal from the sensor and controlling the magnetic fields generated by the electromagnets in response to the sensor signal to position the conveyor belt in the conveyor frame;
wherein the electromagnets are positioned along the conveyor frame to attract the conveyor belt from above.

* * * * *